US007340483B1

(12) United States Patent
Gauthier et al.

(10) Patent No.: US 7,340,483 B1
(45) Date of Patent: Mar. 4, 2008

(54) SYSTEM AND METHOD OF COPYING A MEDIA RESOURCE

(75) Inventors: Matthew Charles Gauthier, Kirkland, WA (US); Eric Lawrence, Sammamish, WA (US); Jennifer Jones, Seattle, WA (US); Bogdan Farcasanu, Bellevue, WA (US); Vamshidar Rawal, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 10/429,110

(22) Filed: May 2, 2003

(51) Int. Cl.
*G06F 7/00* (2006.01)
*G06F 15/16* (2006.01)
(52) U.S. Cl. .................... 707/104.1; 709/203
(58) Field of Classification Search ............ 707/1, 707/2, 10, 101, 104.1; 715/760
See application file for complete search history.

(56) References Cited

U.S. PATENT DOCUMENTS

| 6,011,537 | A * | 1/2000 | Slotznick ............... 715/733 |
| 6,784,925 | B1 * | 8/2004 | Tomat et al. .......... 348/207.11 |
| 6,947,959 | B1 * | 9/2005 | Gill ..................... 715/501.1 |
| 7,051,285 | B1 * | 5/2006 | Harrison et al. .......... 715/760 |
| 2001/0042045 | A1 * | 11/2001 | Howard et al. ............ 705/51 |
| 2002/0049974 | A1 * | 4/2002 | Shnier ................... 725/47 |
| 2002/0082901 | A1 * | 6/2002 | Dunning et al. ............ 705/10 |

OTHER PUBLICATIONS

Danny Goodman, "Dynamic HTML: The Definitive Reference", 1998, pp. 825 and 1029.*
Claverie, D., ACM Southeast Regional Conference, 1998, pp. 1580-162.*
Jamsa K., 1001 Windows98 Tips, Jamsa Press, 1998, p. 107.*
Liepins, P.J., et al., "A Browser Based Image Bank, Useful Tool or Expensive Toy?", *Med. Inform* 23(3):199-206, 1998.
Schwartz, R. L., "Manicured Thumbnails," *NewArchitect.com*, n.d., <http://www.newarchitect.com/archives/1998/09/perl> [retrieved Jul. 21, 2003].

* cited by examiner

*Primary Examiner*—Cheyne D Ly
(74) *Attorney, Agent, or Firm*—Christensen O'Connor Johnson Kindness PLLC

(57) ABSTRACT

The present invention provides a system, method, and computer readable medium for retrieving full media resources in an online environment by manipulating media resource summaries. Media resource summary copy requests are intercepted and instructions to retrieve a corresponding full media resource substituted. The full media resource, rather than the summary, is placed on a computer clipboard, which allows the full media resource to be inserted by a software application into a document. In varied aspects of the present invention, the types of copy events that may be intercepted include keystroke events, copy events, menu copy events, and "drag and drop" copy events.

33 Claims, 6 Drawing Sheets

SYSTEM AND METHOD OF COPYING A MEDIA RESOURCE

FIELD OF THE INVENTION

The present invention relates in general to online media resource retrievals and in particular to a system and method for automating the copying of media files to client devices.

BACKGROUND OF THE INVENTION

Networks are well known in the computer field. By definition, a network is a group of computers and associated devices that are connected by communications facilities or links. An internetwork, in turn, is the joining of multiple computer networks, both similar and dissimilar, by means of gateways or routers that facilitate data transfer and conversion from various networks. A well-known abbreviation for the term internetwork is "internet." As currently understood, the capitalized term "Internet" refers to the collection of networks and routers that use the Internet Protocol ("IP"), to communicate with one another. The Internet has recently seen explosive growth by virtue of its ability to link computers located throughout the world. As will be appreciated from the following description, the present invention could find use in many interactive environments; however, for purposes of discussion, the Internet is used as an exemplary interactive environment for implementing the present invention.

The Internet has quickly become a popular method of disseminating information due, in large part, to its ability to deliver information quickly and reliably. To retrieve online media resources or other data over the Internet, a user typically uses communications or network browsing software. A common way of retrieving online media resources is through a uniform resource locator ("URL") address that provides the location of specific content on a server connected to the Internet.

A drawback of using just a URL to retrieve online media resources (e.g., images, movies, audio files, etc.) has been the stateless nature of many online browsing tools and environments. This stateless nature results in media resources being separated from one another. This separation leaves conceptually related media resources (e.g., reduced-size images related to full-size images, song snippets related to full songs, etc.) being linked solely by passive links using conventional hypertext markup language ("HTML") instructions.

Computer users often do not recognize the effect of the separation between conceptually related online media resources. Computer users often confuse how selectable images (e.g., icons and the like) behave when manipulated by an operating system with how online media resources behave when manipulated online, such as by an Internet browser. When an operating system is instructed to copy a summary of a media source, such as an icon or thumbnail, usually the full media resource is copied. Online environments, such as the World Wide Web ("Web") operate differently. Online environments often display summaries of media resources (such as reduced-size images commonly referred to as "thumbnails") to improve download performance for online interactions. A request to copy a summary of a media resource, such as a thumbnail image from a Web browser to a clipboard only copies the thumbnail image, not the related media resource file. Such copying occurs even if a standard HTML link is available that associates the summary of the media resource to the full media resource.

This difference in behavior between the functions performed by operating systems and the actions that occur in online environments can confuse users. For example, when online users copy only a thumbnail of an image because of their familiarity with operating system performance, such users may mistakenly believe that the full image has been copied. As a result, online users are often disappointed when the quality of the thumbnail does not match that of a full image. This result is particularly undesirable when the user desires to embed the copied thumbnail image in a document. Rather than a full image being embedded, only the thumbnail image is embedded. Similar problems result when only a portion of a song is copied instead of an audio file of the full song.

Accordingly, there is a need for way to modify online media operations such that the copying of a summary of a media resource conforms to the way an operating system functions. The needed methodology must be able to operate with existing operating systems and online browsing tools.

SUMMARY OF THE INVENTION

The present invention is directed to providing a method, system, and computer readable medium for retrieving full media resources in an online environment by manipulating media resource summaries. Requests to copy a media resource summary to an area of memory or resource for storing information, such as a clipboard of a client device, are intercepted and instructions to retrieve a corresponding full media resource are substituted for the summary copy requests. The full media resource is then inserted into the clipboard. Such copying allows the full media resource to be inserted into a software application, and thus into a document, for example. The types of copy requests that may be intercepted include, for example, keystroke requests, copy requests, menu copy requests, and "drag and drop" copy requests.

In accordance with further aspects of the present invention, the full media resource is copied to the clipboard of the client device utilizing an ActiveX secure plug-in to a multimedia browser. The use of an ActiveX secure plug-in to a multimedia browser circumvents restrictions on the multimedia browser being able to fully access the clipboard of the client device.

In accordance with yet another aspect of the present invention, after the copy request has been intercepted, a user is presented with an option to either retrieve and copy the summary of the media resource, or to retrieve and copy the full media resource.

As can be seen from the foregoing summary, the present invention provides a way to modify online media operations such that the copying of a summary of a resource conforms to the way an operating system functions.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description which follows is represented largely in terms of processes and symbolic representations of operations by conventional computer components, including a processor, memory storage devices for the processor, connected display devices, and input devices, all of which are well known in the art. These processes and operations may utilize conventional computing components in a heterogeneous distributed computing environment, including remote file servers, computer servers, and memory storage devices, such processes and operations also being well known to those skilled in the art. Each of these conventional distributing computing components is accessible by the processor via a communications network.

The present invention is directed to retrieving and copying full media resources in an online environment. As will be better understood from the following description, an online client device, such as a computer, requests a media resource summary from a server. The request is intercepted. Instructions to retrieve a corresponding full copy of the media resource are substituted for the summary request. As a result, the full media resource is retrieved.

Figure 1:
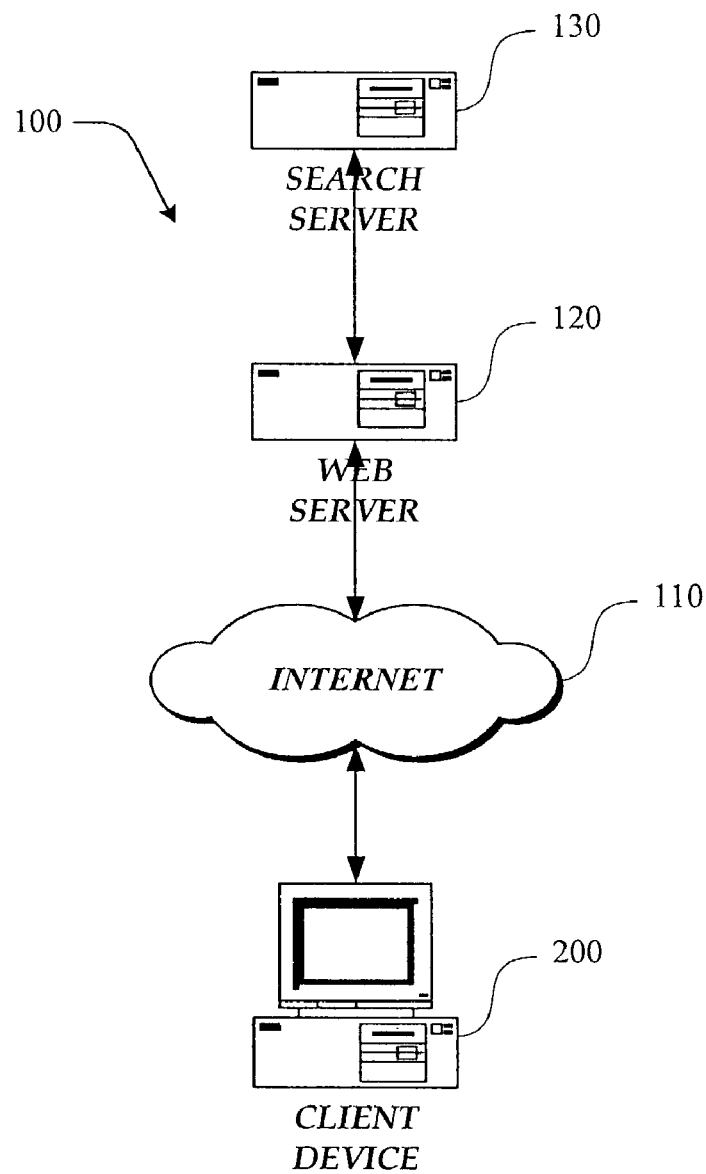
FIG. 1 is a pictorial diagram of an exemplary media resource retrieval system.

As previously explained, the capitalized term "Internet" refers to the collection of networks and routers that communicate with one another. FIG. 1 illustrates a functional block diagram of a system 100 for downloading media resources for client devices. The system 100 comprises a distributed computing environment that includes individual client devices 200, such as computers, interconnected together via a network 110 (such as the Internet). The system 100 shown in FIG. 1 includes a client device 200, a Web server 120, and a search server 130 interconnected via a network 110. More specifically, as illustrated, the client device is connected to the Web server via the network 110. The Web server 120 is connected to the search server 130. This arrangement should be taken as exemplary and not limiting. For example, rather than communicatively coupled directly together, the Web server 120 and the search server 130 could communicate via the network 110.

Client device 200 has computing capabilities and may be any form of device capable of processing the routines of the present invention. An exemplary client device 200 is shown in further detail in FIG. 2 and described below. As will be appreciated by those of ordinary skill in the art, the Web server 120 and search server 130 may reside on any device accessible by the client device 200. Additionally, while only a single client device 200, Web server, and search server 130 have been shown, it will be appreciated that more client devices 200, Web servers 120, and/or search servers 130 may be included in the system 100. Further, while the client device 200 is depicted as a personal computer, it is to be understood that the invention may be useful in many other types of client devices 200.

Figure 2:
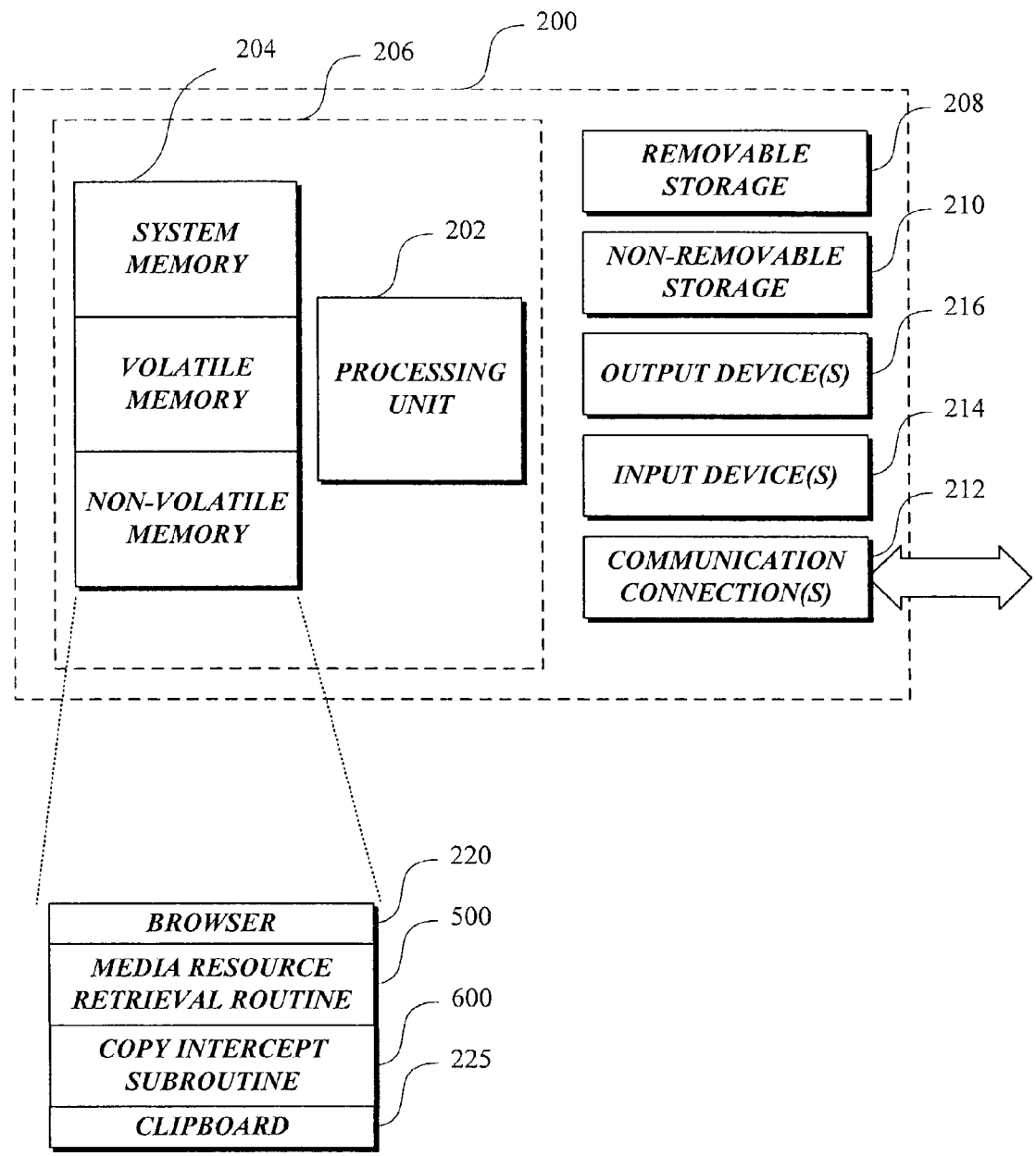
FIG. 2 is a block diagram of a client device, such as a computer, suitable for retrieving media resources in accordance with the present invention.

FIG. 2 illustrates an exemplary client device 200 for implementing hereinafter described aspects of the present invention. In its most basic form, the client device 200 typically includes at least one processing unit 202 and memory 204. Depending on the exact configuration and type of client device, memory 204 may be volatile (such as RAM), nonvolatile (such as ROM, flash memory, etc.), or some combination of the two. This most basic configuration as is illustrated in FIG. 2 by dashed line 206. Client device 200 may also have additional features/functionality. For example, device 200 may also include additional storage (removable and/or nonremovable) including, but not limited to, magnetic or optical disks or tape. Such additional storage is illustrated in FIG. 2 by removable storage 208 and nonremovable storage 210. Computer storage media includes volatile and nonvolatile, removable and nonremovable media implemented in any method or technology for storage of information such as computer readable instructions, data structures, program modules, or other data. Memory 204, removable storage 208, and nonremovable storage 210 are all examples of computer storage media. Computer storage media includes, but is not limited to, RAM, ROM, EEPROM, flash memory, or other memory technology, CD-ROM, digital versatile disks ("DVD"), or other optical storage, magnetic cassettes, magnetic tape, magnetic disk storage or other magnetic storage devices, or any other medium that can be used to store or read desired information and that can be accessed by the client device 200. Any such computer storage media may be part of client device 200.

Figure 5:
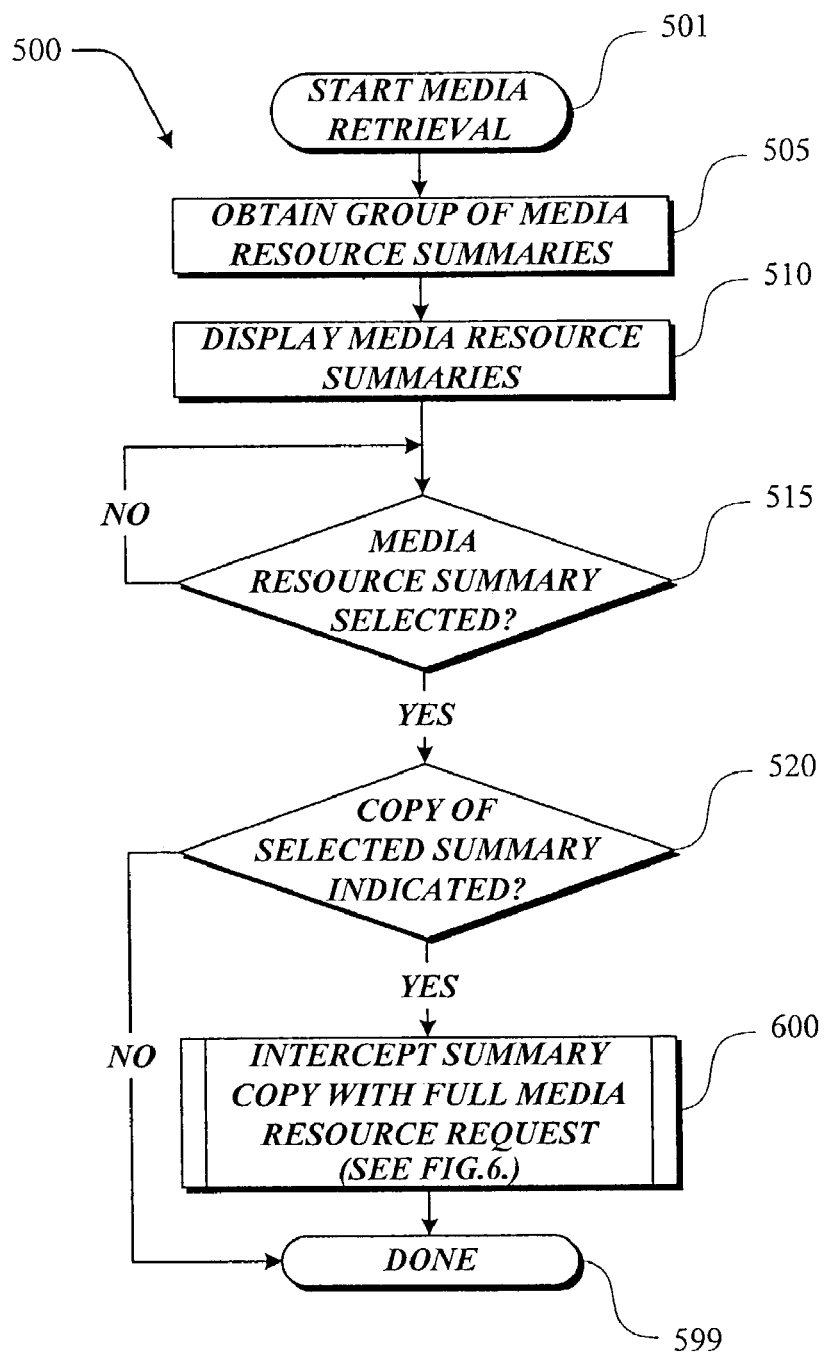
FIG. 5 is an overview flow diagram illustrating a media resource retrieval routine implemented by a client device in accordance with the present invention.
Figure 6:
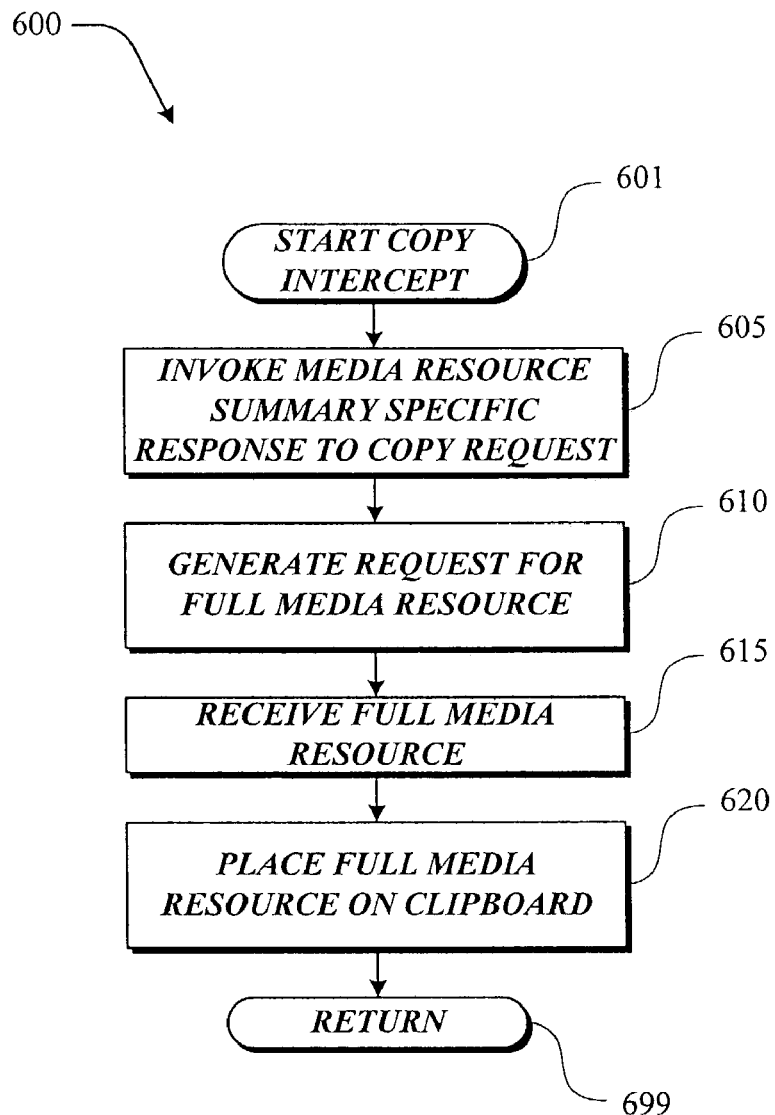
FIG. 6 is an overview flow diagram illustrating a copy interception subroutine suitable for use in FIG. 5.

The client device 200 of the present invention has memory 204 that also stores a multimedia browser 220, a media resource retrieval routine 500, a copy intercept subroutine 600 and an area of memory or resource for storing copies of information, such as a clipboard 225. Media resource retrieval routine 500 and copy intercept subroutine 600 are illustrated in FIGS. 5 and 6, respectively, and are described below. The browser 220 includes programs and/or routines suitable for communicating with and processing information from remote computers, such as Web server 120 and search server 130.

Client device 200 also contains a communications connection 212 that allows the device to communicate with other devices. The communication connection 212 is used to communicate computer-readable instructions, data structures, program modules, or other data using a modulated data signal that includes a carrier wave or other transport mechanism modulated by the data to be communicated. By way of example and not limitation, the communication connection includes wired connections, both copper wire and optical, and wireless connections, such as acoustic, radio frequency, infrared, etc.

Client device 200 may also have input device(s) 214 such as a keyboard, a mouse, a pen, a voice input device, a touch input device, etc. Output device(s) 216 such as a display, speakers, a printer, etc. may also be included in the client device 200. Since all these input and output devices are well known in the art, they are not described here.

Figure 3:
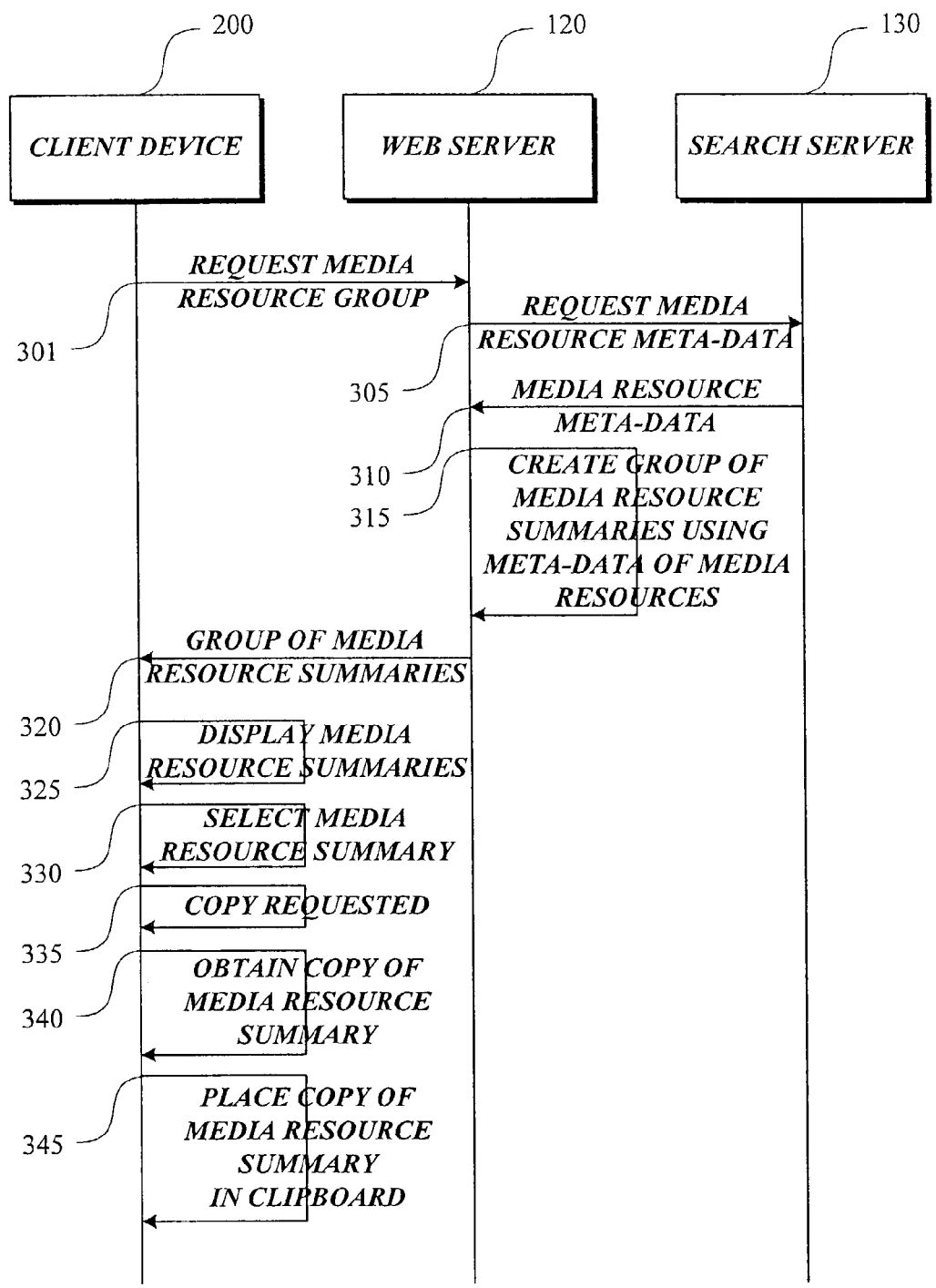
FIG. 3 is a diagram illustrating the actions of a client device, a Web server, and a search server when retrieving a media resource summary in accordance with the prior art.

In order to better understand the present invention, prior to describing the embodiment disclosed herein, the method of operation of prior art systems is first described. In this regard, FIG. 3 illustrates one sequence of the interactions between devices of the communications system 100 shown in FIG. 1 prior to the present invention. The devices of the system 100 illustrated in FIG. 3 include the client device 200, Web server 120, and the search server 130.

An exemplary prior art media resource summary retrieval is initiated when the client device 200 sends a request for a group of media resources 301 to the Web server 120. In response, the Web server 120 requests media resource metadata 305 from the search server 130. The media resource metadata includes information describing media resources that match the media resource group request sent by the client device 200. The media resource metadata includes media resource identifications for each media resource matching the media resource group request. The media resource metadata is returned 310 by the search server 130 to the Web server 120. Next, a group of media resource summaries is created 315 using the returned metadata. The group of media resource summaries is then sent 320 to the client device 200. Full media resource are larger and slower to transfer, thus sending the media resource summaries allows a user to select a resource of interest before incurring the retrieval time of a full resource. The media resource summaries are then displayed 325 at the client device 200. If one of the media resource summaries is selected 330 by a user, a copy of the media resource summary is requested 335 by the client device 200. The client device 200 obtains 340 a copy of the media resource summary from the group of media resource summaries. The copy of the media resource summary is placed 345 in the clipboard 225 of the client device 200.

As can be seen from the above description, the interactions and operations of the client device 200, the Web server 120, and the search server 130 generally conform to a conventional Web and HTML operating environment. The media resource summaries, which have corresponding full media resources, do not result in a full media resource being obtained by the client device 200 when a request for a copy of a media summary is executed. For example, if the request for a media resource group produced a group of thumbnails (i.e., the summaries are thumbnails), the thumbnail images, not the full images, would be copied to the clipboard.

Figure 4:
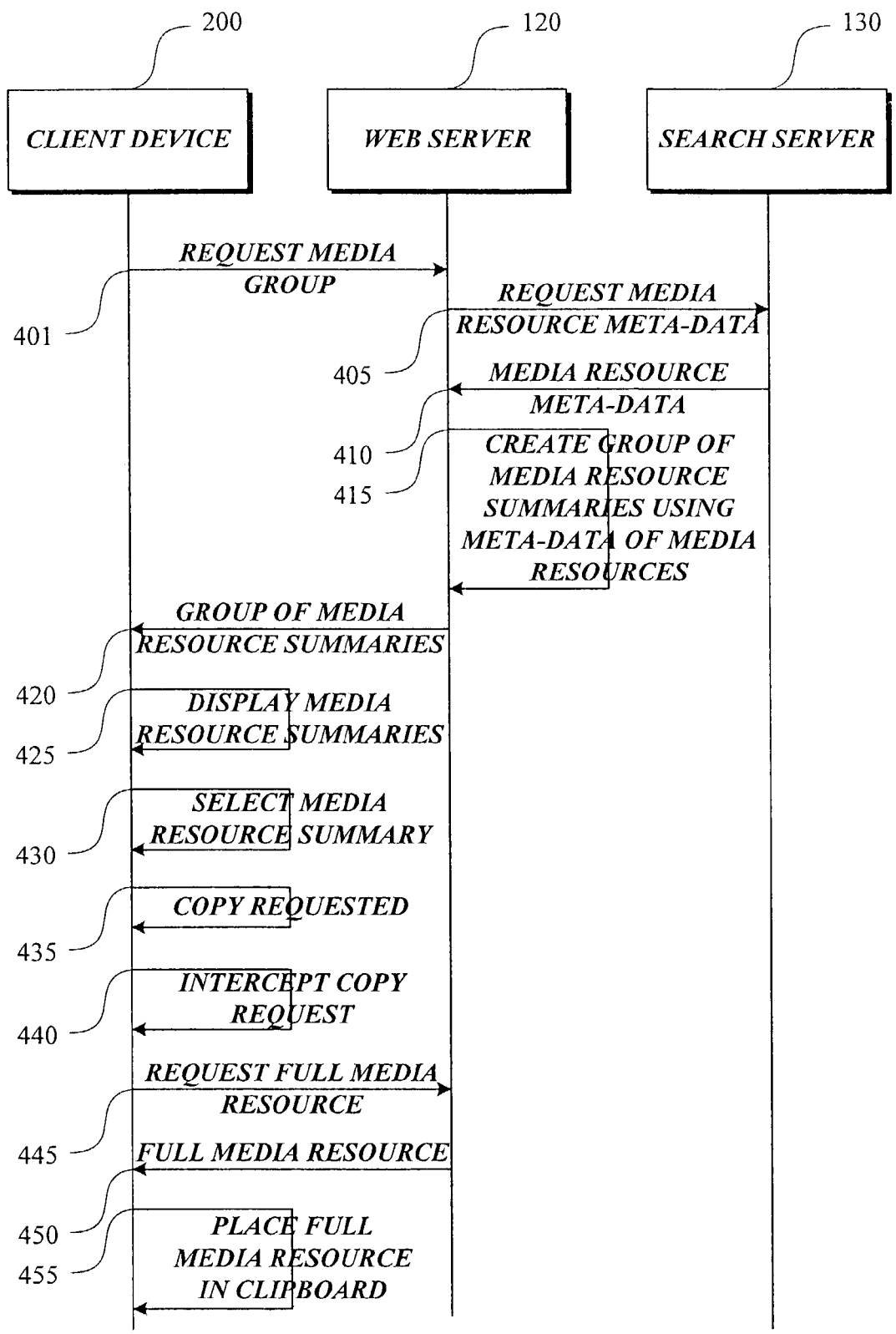
FIG. 4 is a diagram illustrating the actions of a client device, a Web server, and a search server when retrieving a full media resource in accordance with the present invention.

FIG. 4 illustrates one sequence of the interactions between devices and the communications system 100 shown in FIG. 1 in accordance with the present invention. The devices of system 100 illustrated in FIG. 4 include the client device 200, Web server 120 and the search server 130.

An exemplary media resource retrieval is initiated when the client device 200 sends a request for a group of media resources 401 to the Web server 120. The Web server 120 then requests media resource metadata 405 from the search server 130. The media resource metadata includes information describing media resources that match the media resource group request sent by the client device 200. The media resource metadata includes media resource identifications for each media resource matching the media resource group request. The media resource metadata is returned from the search server 130 back to the Web server 120. Next, a group of the media resource summaries is created 415 using the returned metadata. The group of media resource summaries is then sent 420 to the client device 200. The media resource summaries are then displayed 425 at the client device 200. If one of the media resource summaries is selected 430 by a user, a copy of the media resource summary is requested 435.

Unlike the prior art system whose interactions are illustrated in FIG. 3 and described above, when a copy instruction occurs in a client device embodying the present invention, rather than being used to retrieve a copy of the selected media resource summary, the copy request 435 is intercepted 440. Those of ordinary skill in the art and others will appreciate that copy request interceptions may be accomplished in a number of different manners. In one exemplary embodiment of the present invention, the copy request is intercepted when the occurrence of a dynamic hypertext mark-up language ("DHTML") copy event is detected. DHTML includes a number of detectable events. In at least one version of DHTML, one event is an "object.oncopy" event. This event is used to handle specific copy requests for a DHTML object, such as a media resource. DHTML events are detectable by a number of page scripting languages, such as JScript and Visual Basic scripting. Copy events may be triggered by any conventional copy instruction, such as a keyboard copy request (e.g., CTRL-C or CTRL-Insert), a menu copy request (e.g., from a menu bar or pop-up bar) or from a "drag and drop" of a selected media resource summary (i.e., a "drag" would initiate an "object.ondragstart" DHTML event). Even though drag and drop operations would trigger a different event, a full media resource retrieval could still be initiated from such an even.

After the copy request has been intercepted, a full media resource request 445 is sent from the client device 200 to the Web server 120 (or some other Web server if the full media resource is stored at some other location). In one exemplary embodiment of the present invention, the full media resource request 445 includes media resource metadata identifying the full media resource. The Web server 120 then returns 450 the full media resource to the client device 200. Next, the full media resource is placed on the clipboard 225 of the client device. As noted above and well known to those of ordinary skill in the art and others a clipboard 225 is a computer resource having copy, cut, and paste functionality that allows information to be transferred from one program to another. Therefore, once the full media resource is placed on the clipboard 225 of the client device, it is available to be copied into a document by the client device 200.

As illustrated in FIGS. 1, 2, and 4, the embodiment of the media resource copying system 100 described herein includes a client device 200 that is used to retrieve copies of media resources. A flowchart illustrating a media resource retrieval routine 500 for copying a media resource to a client device 200, in accordance with one embodiment of the present invention, is shown in FIG. 5. The media resource retrieval routine 500 begins at block 501 and proceeds to block 505 where a group of media resource summaries is obtained from a remote computer (e.g., Web server 120). The media resource summaries are then displayed at the client device 200 at block 510. In exemplary embodiments of the present invention, the media resource summaries are displayed in the browser 220, and/or on a suitable one of the output devices 216. Next, in decision block 515 a determination is made whether a media resource summary has been selected as a result of user action. One of ordinary skill in the art and others will appreciate that media resource summaries may be selected in a number of different manners. In one exemplary embodiment of the present invention, media resource summaries are displayed as thumbnail images in browser 220. Selecting such a media resource summary may comprise highlighting one of the thumbnail images using an input device 214. Next, in decision block 520, a determination is made whether a copy request was indicated to trigger a copy event (e.g., via a DHTML "oncopy" event). If no copy event occurs, the media resource retrieval routine 500 ends at block 599. No copy event may occur if, for example, the user discards the group. If, however, in decision block 520 a copy event occurs, then processing continues to subroutine block 600 where the copy of the summary is intercepted and a full media resource request substituted. Copy intercept subroutine 600 is illustrated in FIG. 6 and described below. After the copy intercept subroutine 600 returns, processing continues to block 599 where the media resource retrieval routine 500 ends.

As noted above, FIG. 6 illustrates an exemplary copy interception subroutine 600. Exemplary copy interception subroutine 600 begins at block 601 and proceeds to block 605 where a media resource summary specific response to a copy request is invoked. In one exemplary embodiment of the present invention, the media resource summary specific response includes obtaining a media resource identification from the media resource summary. This result is accomplished by sending the metadata associated with the selected media resource summary, which may be included with the media resource group sent to the client device, or stored in a location identified in the group. Next, in block 610, a request for a full media resource is generated using the media resource identification obtained from the media resource summary. The full media resource request is sent to a remote computer, such as the Web server 120, to request the full media resource that corresponds to the selected media resource summary. In block 615, the full media resource is received. Next, in block 620 the full media resource is placed on the clipboard. Subroutine 600 then proceeds to block 699 where processing returns to its calling routine.

Those of ordinary skill in the art and others will appreciate that conventional multimedia browsers and operating systems restrict the browser's access to the clipboard 225. This separation is to ensure that programs executed by the browser 220 do not intentionally or unintentionally compromise the security of the client device 200. The present invention circumvents this separation between the browser 220 and clipboard 225 in one embodiment, by using a secure ActiveX "plug-in" (a digitally signed program module that integrates with and enhances the operation of the browser 220). The secure plug-in communicates the full media resource data from the browser 220 to the clipboard 225. Using a secure plug-in allows the desired security of a separate browser 220 and clipboard 225 to be maintained, while allowing full media resources to be inserted into the clipboard 225. Those of ordinary skill in the art and others will appreciate that other computer program module may be utilized to provide similar functionality. For example, a JAVA applet, Netscape plug-in or a .NET control may operate in a similar manner as the above-described ActiveX plug-in.

In an alternate embodiment of the present invention, after a copy request is intercepted, an option to copy the media resource summary or the full media resource is presented. Those of ordinary skill in the art and others will appreciate that a number of different presentations of options are possible. In one exemplary embodiment the option to copy the media resource summary or the full media resource is presented in a dialog box.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A computer implemented method for retrieving a full image file type associated with a media resource summary presented by a multimedia browser, the method comprising:

displaying the media resource summary in the multimedia browser in a client device wherein the media resource summary is a reduced-sized image file type;

receiving at the client device a request from a user to retrieve a media resource summary, the user request including a copy event;

in response to a copy event, the client device generating a request for a copy of the media resource summary from a remote server, the copy request including metadata identifying the media resource summary;

intercepting the request for a copy of the media resource summary by the client device;

in response to the intercepting, rather than retrieving the media resource summary, automatically without further user input, sending a request by the client device to the remote server for the full image file type corresponding to the requested media resource summary the request for the full image file type including the metadata from the media resource summary identifying said full image file type; and the client device retrieving from the remote server the requested full image file type identified by the metadata.

2. The method of claim 1, further comprising copying said full media resource to a clipboard.

3. The method of claim 2, wherein retrieval restrictions are circumvented by utilizing a secure plug-in for said multimedia browser.

4. The method of claim 3, wherein retrieval restrictions on said multimedia browser are circumvented using ActiveX instructions.

5. The method of claim 3, further comprising displaying an option to retrieve either said media resource or said media resource summary.

6. The method of claim 1, further comprising receiving a media resource search request, and generating a group of media resource summaries in response to said media resource search request, said media resource summary included in said group of media resource summaries.

7. The method of claim 1, wherein said copy event is generated in response to a keystroke copy event.

8. The method of claim 1, wherein said copy event is generated in response to a menu copy event.

9. The method of claim 1, wherein said copy event is generated in response to a media resource summary drag initiation.

10. The method of claim 1, wherein said copy event is a dynamic hypertext markup language event.

11. The method of claim 1, further comprising displaying an option to retrieve either said media resource or said media resource summary.

12. A computer storage media containing computer instructions when executed performs a method for retrieving a full image file type associated with a media resource summary presented by a multimedia browser, the method comprising:

displaying the media resource summary in the multimedia browser in a client device wherein the media resource summary is a reduced-sized image file type;

receiving by the client device a request from a user selection to retrieve a media resource summary, the user selection including a copy event;

in response to a copy event, generating by a client device a request for a copy of the media resource summary from a remote server, the copy request including metadata identifying the media resource summary;

intercepting the request for a copy of the media resource summary by the client device;

in response to the intercepting, rather than retrieving the media resource summary, automatically without further user input, sending a request by the client device to the remote server for the full image file type corresponding to the requested media resource summary, the request for the full image file type including the metadata from the media resource summary identifying said full image file type; and the client device retrieving from the remote server the requested full image file type identified by the metadata.

13. The computer storage media of claim 12, further comprising copying said full media resource to a clipboard.

14. The computer storage media of claim 13, wherein retrieval restrictions are circumvented by utilizing a secure plug-in for said multimedia browser.

15. The computer storage media of claim 14, wherein retrieval restrictions on said multimedia browser are circumvented using ActiveX instructions.

16. The computer storage media of claim 14, further comprising displaying an option to retrieve either said media resource or said media resource summary.

17. The computer storage media of claim 12, further comprising receiving a media resource search request, and generating a group of media resource summaries in response to said media resource search request, said media resource summary included in said group of media resource summaries.

18. The computer storage media of claim 12, wherein said copy event is generated in response to a keystroke copy event.

19. The computer storage media of claim 12, wherein said copy event is generated in response to a menu copy event.

20. The computer storage media of claim 12, wherein said copy event is generated in response to a media resource summary drag initiation.

21. The computer storage media of claim 12, wherein said copy event is a dynamic hypertext markup language event.

22. The computer storage media of claim 12, further comprising displaying an option to retrieve either said media resource or said media resource summary.

23. A computing apparatus having a processor and a memory storing executable instructions when executed by the processor performs a method for retrieving a full image file type associated with a media resource summary presented by a multimedia browser, the method comprising:

displaying the media resource summary in the multimedia browser in a client device wherein the media resource summary is a reduced-sized image file type;

receiving by the client device a request from a user selection to retrieve a media resource summary, the user selection including a copy event;

in response to a copy event, generating by a client device a request for a copy of the media resource summary from a remote server, the copy request including metadata identifying the media resource summary;

intercepting the request for a copy of the media resource summary by the client device;

in response to the intercepting, rather than retrieving the media resource summary, automatically without further user input, sending a request by the client device to the remote server for the full image file type corresponding to the requested media resource summary, the request for the full image file type including the metadata from the media resource summary identifying said full image file type; and the client device retrieving from the remote server the requested full image file type identified by the metadata.

24. The computing apparatus of claim 23, further comprising copying said full media resource to a clipboard.

25. The computing apparatus of claim 24, wherein retrieval restrictions are circumvented by utilizing a secure plug-in for said multimedia browser.

26. The computing apparatus of claim 25, wherein retrieval restrictions on said multimedia browser are circumvented using ActiveX instructions.

27. The computing apparatus of claim 25, further comprising displaying an option to retrieve either said media resource or said media resource summary.

28. The computing apparatus of claim 23, further comprising receiving a media resource search request, and generating a group of media resource summaries in response to said media resource search request, said media resource summary included in said group of media resource summaries.

29. The computing apparatus of claim 23, wherein said copy event is generated in response to a keystroke copy event.

30. The computing apparatus of claim 23, wherein said copy event is generated in response to a menu copy event.

31. The computing apparatus of claim 23, wherein said copy event is generated in response to a media resource summary drag initiation.

32. The computing apparatus of claim 23, wherein said copy event is a dynamic hypertext markup language event.

33. The computing apparatus of claim 23, further comprising displaying an option to retrieve either said media resource or said media resource summary.

* * * * *